Jan. 8, 1957 P. B. CARDON 2,776,877
ROTARY DIGESTER
Filed July 17, 1953
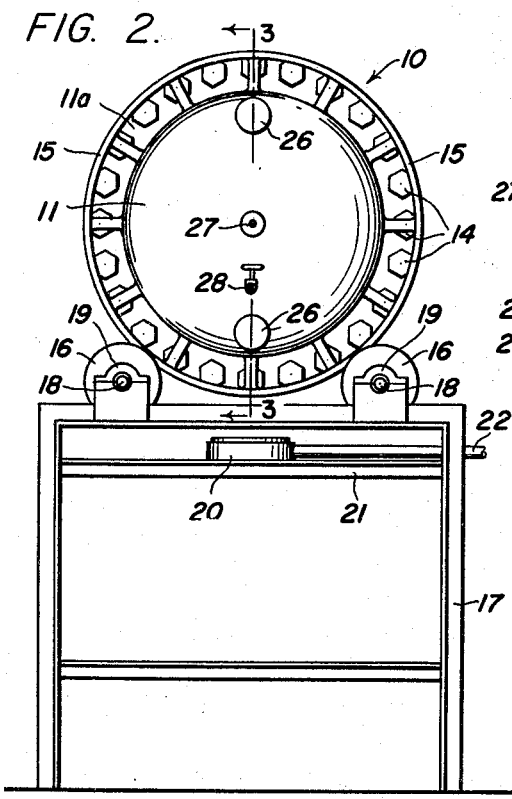
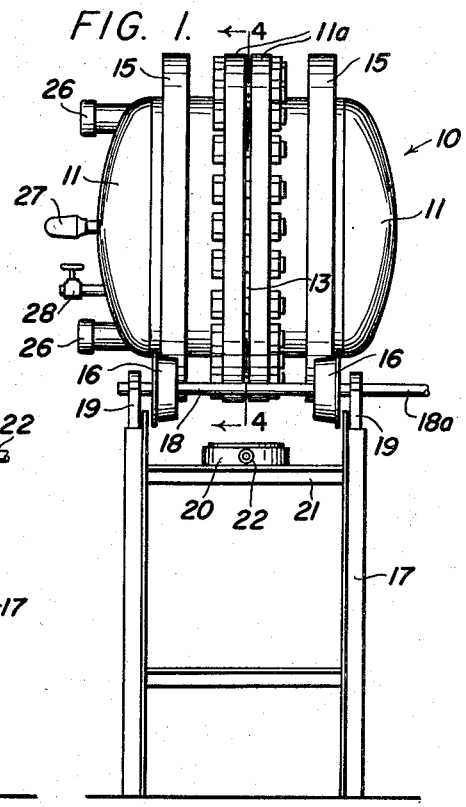
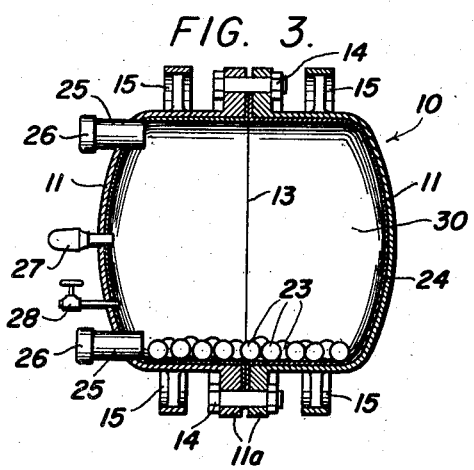
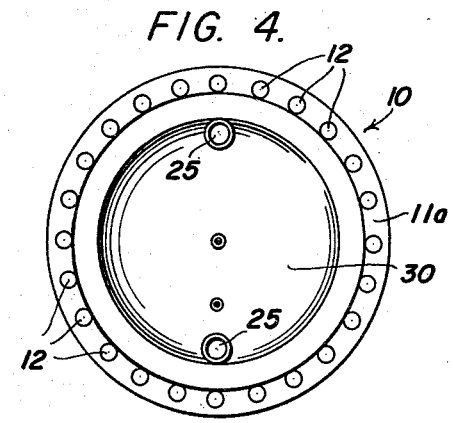
Inventor:
PAUL B. CARDON,
By H. Mallinckrodt and
Philip A. Mallinckrodt,
Attorneys.

United States Patent Office 2,776,877
Patented Jan. 8, 1957

2,776,877

ROTARY DIGESTER

Paul B. Cardon, Murray, Utah, assignor to Minerals Refining Co., Murray, Utah, a corporation of Nevada Application July 17, 1953, Serial No. 368,705

1 Claim. (Cl. 23—290.5)

This invention relates to chemical processing methods and to apparatus for accomplishing same.

It is well known in the chemical and metallurical arts that many chemical processes, which involve the reacting of dense and hard solid particles with other materials under conditions of heat and pressure, are carried to completion only with difficulty and slowly. These processes are commonly referred to as "digestion."

In working with the problems of processing certain mineral sands for the recovery of so-called "rare earths," I came to the conclusion that digestion processes applied to such minerals could be appreciably speeded up and carried to a greater degree of completion than ordinarily obtainable under conventional digestion procedures, if the surface coating of reaction products as progressively formed on the individual particles, could be continually removed during the progress of the digestion process, thereby continually exposing fresh surfaces of the solid particles to the chemical materials and conditions of reaction.

In this connection, it occurred to me that subjection of the solid particles to continuous attrition during the processing thereof, and without altering the conditions of applied heat and pressure, would tend to bring about the desired result of continuous removal of surface coatings of reaction products and the successive exposure of fresh particle surfaces for reaction. This was borne out in practice.

A principal object of the present method, therefore, is to speed up and insure complete chemical digestion of dense and hard solid particles, under processing conditions of applied heat and pressure, by continually exposing fresh surfaces thereof.

An equally important object is to carry this out without interfering with the application of the required heat and pressure during the processing operation.

In accordance with this invention, these objectives are accomplished by physically tumbling the materials undergoing processing, in the presence of an agency of attrition which is chemically inert to the materials being processed.

Apparatus which I have constructed for carrying out the method of the invention to best advantage includes a rotary digester adapted to be sealed against the outside atmosphere to provide, in effect, a pressure cooker. Mechanism for rotating the pressure vessel is provided, as are means for applying heat to the vessel during its rotation.

A very satisfactory attrition agent for many processes has been found to be steel balls, similar to those employed in ball mills, though, here, relatively few of the balls are required, ordinarily only a small fraction of the number of balls customarily used in a ball mill, for example, one-tenth considering the capacity of the particular unit concerned.

The balls or other attrition agents are preferably entirely unrestrained, and are free to roll as they will within the pressure vessel during the processing operation. I have found that their action accomplishes a very satisfactory attrition of the solid particles being processed, particularly in the instance of mineral particles, such as monazite sands being digested in the presence of sodium hydroxide or similar alkaline solution at elevated temperatures and pressures in accordance with a new process for recovering rare earths for which I am about to make application for patent.

While steel balls or rods have been found to be highly successful as the agency of attrition in the instance mentioned above, it must be realized that other materials may require somewhat less vigorous attrition during the processing operation, and that a variety of other agents of attrition may be utilized for the various processing operations which may be carried out in accordance with my method and utilizing my apparatus.

Further objects and features of the invention will become apparent from the following detailed description of the preferred form of apparatus illustrated in the accompanying drawing.

In the drawing:

Fig. 1 represents a side elevation of the apparatus;

Fig. 2, a front elevation;

Fig. 3, a vertical section taken on the line 3—3 of Fig. 2, showing only the pressure digestion vessel; and Fig. 4, a vertical section taken on the line 4—4 of Fig. 1, likewise showing only the pressure digestion vessel.

Referring to the drawing:

In the illustrated form of the apparatus of the invention, a rotary pressure vessel or digester 10 is made up of two similarly formed, deeply cupped shells, designated 11, respectively, such shells having outwardly extending, circumferential flanges 11a, provided with circumferentially extending series of closely spaced bolt-receiving holes 12.

The two shells 11 are positioned with their flanges 11a in face-to-face registry and with their bolt-receiving holes 12 in alignment. A heat-resistant gasket is provided between the inner circumferential portions of the mating flanges, preferably by means of overlapping portions 13a of a corrosion-resistant lining 13, such as a nickel alloy or the like, and a series of bolts 14 are introduced into respective aligned pairs of holes 12, and are securely tightened to effect a pressure-tight joinder between the opposing shells.

Each of the shells 11 is provided with a circumferential track 15 adapted to ride upon spaced sets of mutually spaced wheels 16 carried by a supporting stand 17. Both sets of wheels 16 are mounted for rotation on respective shafts 18 journaled by the bearings 19. At least one set of wheels 16 is arranged to be driven from any suitable source of power, its shaft 18 being extended for the purpose, see 18a, Fig. 1.

It will be noted that, during the processing operation, the pressure vessel 10 is continuously rotated at any desired speed by reason of the friction drive between the powered set of wheels 16 and the track 15.

Heat is conveniently applied to the pressure vessel 10, during its rotation, by means of a burner 20 supported by a shelf 21 of the stand 17. As illustrated, the burner 20 is a gas burner, and is supplied with gas, as a fuel, through the supply line 22. The flame of burner 20 plays on the mating flanges 11a as the pressure vessel rotates. Heat is transferred to the contents of the pressure vessel by conduction.

The agency of attrition is, in this illustrated instance, a number of steel balls 23, similar to those used in the conventional ball mill, though, as stated hereinbefore, being relatively few in number. In the particular illustrated form of digester, ten of the steel balls serve the purpose very well.

It is convenient to provide ports as at 25, through one of the shells 11, for the successive charging and discharging of the digester, such ports being closed and sealed by respective removable screw caps 26, Fig. 3. A pressure gauge and safety valve assembly 27 is also advantageously provided, as well as a manually controlled valve 28 for bleeding off air as the pressure rises.

It can be seen that the described apparatus is admirably adapted to carry out the method of the invention. During the processing operation, whereby the solid particles are digested by chemical reactant materials introduced into the pressure chamber 30 of the digester 10, the materials being processed are subjected to tumbling action by reason of the rotation of the entire pressure vessel 10 and to positive attrition by means of the balls 23. At the same time, heat is being continuously supplied by way of the burner 20.

The steel balls 23 exert a continuous scrubbing and eroding action on the solid particles, to positively expose fresh surfaces thereof to the chemical reactant materials and under the constantly maintained heat and pressure conditions of the operation.

While the particular form of apparatus here specifically illustrated is presently preferred, it should be realized that various changes may be made without departing from the scope of the claim which here follows.

I claim:

Chemical digestive apparatus for discrete solid particles, comprising a pressure-tight vessel; a track encircling said vessel; a roller cradle mounting said track; means for rotating at least one of said rollers as a friction drive for said vessel; means for applying heat to said vessel during rotation thereof; and physical attrition means disposed in free tumbling relationship with said vessel, the said vessel being formed of two substantially similar, cup-shaped parts having externally projecting rim flanges of heat conductive material, and of means removably securing said parts together in flange face to flange face, opposing, pressure-tight relationship, the flanges being disposed between said track, and the heat-applying means being disposed intermediate the roller cradle in position for applying heat to said flanges during rotation of the vessel.

References Cited in the file of this patent

UNITED STATES PATENTS

| | | |
|---|---|---|
| 986,180 | Koenig | Mar. 7, 1911 |
| 1,293,402 | Giles | Feb. 4, 1919 |
| 1,842,092 | Harshaw et al. | Jan. 19, 1932 |
| 2,098,054 | McBerty | Nov. 2, 1937 |
| 2,509,303 | Jellinek | May 30, 1950 |